US00RE37787E

(19) United States
(12) Reissued Patent
Uddenfeldt et al.

(10) Patent Number: US RE37,787 E
(45) Date of Reissued Patent: Jul. 9, 2002

(54) HANDOVER METHOD FOR MOBILE RADIO SYSTEM

(75) Inventors: Jan E. Uddenfeldt, Hässelby (SE); Alex K. Raith, Durham, NC (US)

(73) Assignee: Telefonaktiebolaget LM Ericsson (publ), Stockholm (SE)

( * ) Notice: This patent is subject to a terminal disclaimer.

(21) Appl. No.: 09/235,456

(22) Filed: Jan. 21, 1999

Related U.S. Patent Documents

Reissue of:
(64) Patent No.: 5,109,528
Issued: Apr. 28, 1992
Appl. No.: 07/365,432
Filed: Jun. 13, 1989

U.S. Applications:

(63) Continuation of application No. 08/938,840, filed on Sep. 26, 1997, now Pat. No. Re. 36,079.

(30) Foreign Application Priority Data

Jun. 14, 1988 (SE) ..... 8802298

(51) Int. Cl.[7] ..... H04Q 7/00
(52) U.S. Cl. ..... 455/442; 455/524; 370/331
(58) Field of Search ..... 455/436, 438, 455/442, 524, 525, 502, 503, 517, 450, 509; 370/331

(56) References Cited

U.S. PATENT DOCUMENTS

| | | | |
|---|---|---|---|
| 2,745,953 | A | 5/1956 | Young |
| 3,819,872 | A | 6/1974 | Hamrick |
| 4,057,758 | A | 11/1977 | Hattori |
| 4,097,804 | A | 6/1978 | Yamaguchi et al. |
| 4,112,257 | A | 9/1978 | Frost |
| 4,152,647 | A | 5/1979 | Gladden et al. |

(List continued on next page.)

FOREIGN PATENT DOCUMENTS

| | | |
|---|---|---|
| DE | 2022425 | 11/1971 |
| DE | 3012141 | 10/1981 |
| EP | 0 040 731 | 12/1981 |

(List continued on next page.)

OTHER PUBLICATIONS

Bernhardt, R., User Access in Portable Radio Systems in the Noise Limited Environment, IEEE International Conference on Communications '87, pp. 1–8 (1987).

Bernhardt, R., RF Performance of Macroscopic Diversity in Universal Digital Portable Radio Communications: Frequency Reuse Considerations, IEEE International Conference on Communications, pp. 65–71 (1986).

(List continued on next page.)

*Primary Examiner*—Edward F. Urban
(74) *Attorney, Agent, or Firm*—Burns, Doane, Swecker & Mathis, L.L.P.

(57) ABSTRACT

The invention relates to a method in mobile radio systems in which the responsibility for transmitting message information to a mobile station is handed over from a first base station transmitter to a second base station transmitter. In this method, the same radio channel is used, if possible, before and after the handover for transmitting message information to the mobile station. If the same radio channel can be utilized, the handover takes place without the mobile station being informed beforehand of the handover by a special signal or order or the like. In digital mobile ratio systems with digital transmission of message information by digital modulation of the radio signals, the transmission is preferably started from a second base station transmitter before the transmission is terminated from a first base station transmitter. During a certain transmission time substantially the same message information is transmitted to the mobile station from both the first and second base station transmitters.

6 Claims, 2 Drawing Sheets

U.S. PATENT DOCUMENTS

| | | | |
|---|---|---|---|
| 4,211,894 | A | 7/1980 | Watanabe et al. |
| 4,222,115 | A | 9/1980 | Cooper et al. |
| 4,255,814 | A | 3/1981 | Osborn |
| 4,308,429 | A | 12/1981 | Kai et al. |
| 4,383,332 | A | 5/1983 | Glance et al. |
| 4,398,063 | A | 8/1983 | Hass et al. |
| 4,475,246 | A | 10/1984 | Batlivala et al. |
| 4,490,830 | A | 12/1984 | Kai et al. |
| 4,516,269 | A | 5/1985 | Krinock |
| 4,596,042 | A | 6/1986 | Stangl |
| 4,633,519 | A | 12/1986 | Gotoh et al. |
| 4,642,633 | A | 2/1987 | Dunkerton et al. |
| 4,644,560 | A | 2/1987 | Torre et al. |
| 4,667,202 | A | 5/1987 | Kamerlander et al. |
| 4,670,899 | A | 6/1987 | Brody et al. |
| 4,675,863 | A | 6/1987 | Paneth et al. |
| 4,696,051 | A | 9/1987 | Breeden |
| 4,696,052 | A | 9/1987 | Breeden |
| 4,697,260 | A | 9/1987 | Grauel et al. |
| 4,698,839 | A | 10/1987 | DeVaney et al. |
| 4,715,048 | A | 12/1987 | Masamura |
| 4,718,081 | A | 1/1988 | Brenig |
| 4,718,109 | A | 1/1988 | Breeden et al. |
| 4,723,266 | A | 2/1988 | Perry |
| 4,737,978 | A | 4/1988 | Burke et al. |
| 4,759,051 | A | 7/1988 | Han |
| 4,765,753 | A | 8/1988 | Schmidt |
| 4,771,448 | A | 9/1988 | Koohgoli |
| 4,811,380 | A | 3/1989 | Spear |
| 4,850,032 | A | 7/1989 | Freeburg |
| 4,852,090 | A | 7/1989 | Borth |
| 4,856,048 | A | 8/1989 | Yamamoto et al. |
| 4,901,307 | A | 2/1990 | Gilhousen et al. |
| 4,930,140 | A | 5/1990 | Cripps et al. |
| 4,955,082 | A | 9/1990 | Hattori et al. |
| 4,984,247 | A | 1/1991 | Kaufmann et al. |
| 5,022,049 | A | 6/1991 | Abrahamson et al. |
| 5,048,059 | A | 9/1991 | Dent |
| 5,056,109 | A | 10/1991 | Gilhousen et al. |
| 5,091,942 | A | 2/1992 | Dent |
| 5,095,531 | A | 3/1992 | Ito |
| 5,101,501 | A | 3/1992 | Gilhousen et al. |
| 5,103,459 | A | 4/1992 | Gilhousen et al. |
| 5,109,390 | A | 4/1992 | Gilhousen et al. |
| 5,124,698 | A | 6/1992 | Mustonen |
| 5,126,748 | A | 6/1992 | Ames et al. |
| 5,128,959 | A | 7/1992 | Bruckert |
| 5,179,571 | A | 1/1993 | Schilling |
| 5,257,283 | A | 10/1993 | Gilhousen et al. |
| 5,265,119 | A | 11/1993 | Gilhousen et al. |
| 5,267,261 | A | 11/1993 | Blakeney, II et al. |
| 5,267,262 | A | 11/1993 | Wheatley, III |
| 5,280,472 | A | 1/1994 | Gilhousen et al. |
| 5,383,219 | A | 1/1995 | Wheatley, III et al. |
| 5,437,055 | A | 7/1995 | Wheatley, III |
| 5,452,473 | A | 9/1995 | Weiland et al. |
| 5,461,639 | A | 10/1995 | Wheatley, III et al. |
| 5,475,870 | A | 12/1995 | Weaver, Jr. et al. |
| 5,485,486 | A | 1/1996 | Gilhousen et al. |
| 5,490,165 | A | 2/1996 | Blakeney, II et al. |
| 5,509,035 | A | 4/1996 | Teidelmann, Jr. et al. |
| 5,513,176 | A | 4/1996 | Dean et al. |
| 5,519,761 | A | 5/1996 | Gilhousen |
| 5,528,593 | A | 6/1996 | English et al. |

FOREIGN PATENT DOCUMENTS

| | | |
|---|---|---|
| EP | 0 072 479 | 2/1983 |
| EP | 0 072 984 | 3/1983 |
| EP | 0274857 A1 | 7/1988 |
| JP | 0045882 | 1/1970 |
| JP | 57-73539 | 5/1982 |
| JP | 58-111443 | 7/1983 |
| JP | 58-159083 | 9/1983 |
| JP | 59-176935 | 10/1984 |
| JP | 59-212041 | 11/1984 |
| JP | 60-42950 | 3/1985 |
| JP | 60-52131 | 3/1985 |
| JP | 61-171269 | 8/1986 |
| JP | 62-132444 | 6/1987 |
| WO | WO87/01897 | 3/1987 |
| WO | WO90/13187 | 11/1990 |
| WO | WO91/07020 | 5/1991 |

OTHER PUBLICATIONS

Viterbi, A., Very Low Rate Convolutional Codes for Maximum Theoretical Performance of Spread–Spectrum Multiple–Access Channels, IEEE Journal on Selected Areas in Communications, vol. 8, No. 4, pp. 641–649 (1990).

Kerdock, A., A Class of Low–Rate Nonlinear Binary Codes, Information and Control, vol. 20, pp. 182–187 (1972).

MacWilliams, F., et al., *The Theory of Error–Correcting Codes*, Part I, pp. 93–124 (1977).

Macwilliams, F., et al., *The Theory of Error–Correcting Codes*, Part II, pp. 451–465 (1977).

Frenkiel, R., A High–Capacity Mobile Radiotelephone System Model Using a Coordinated Small–Zone Approach, IEEE Transaction on Vehicular Technology, vol. VT–19, No. 2, pp. 173–177 (1970).

Shefer, J. et al., An X–Band Vehicle–Location System, IEEE Transaction on Vehicular Technology, vol. VT–21, No. 4, pp. 117–120 (Nov., 1972).

Morinaga, T., et al., Automatic Selection of Fixed Receiving Stations in Mobile Radio Systems, Review of the Electrical Communication Laboratory, vol. 16, Nos. 5–6, pp. 374–384 (May–Jun. 1968).

Spilker, J. Jr., et al., The Delay–Lock Discriminator–An Optimum Tracking Device, Proc. Inst. Radio Engrs. 43, pp. 1403–1416 (1961).

Sergo, J., et al., Analysis and Simulation of a PN Synchronization System, IEEE Transactions Com–18, pp. 676–679 (1970).

Okumura, Y., et al., Field Strength and its Variability in VHF and UHF Land–Mobile Radio Service, Ref. Electr. Commun. Lab. (Japan) 15, pp. 825–873 (1968).

Figel, W., et al., Vehicle Location by a Signal Attenuation Method, IEEE Transactions VT–18, pp. 105–109 (1969).

Nakajima, A., Advanced Mobile Communication Network Based on Signaling System No. 7, International Switching Symposium (1987).

Turin, G., Introduction to Spread–Spectrum Antimultipath Techniques and Their Application to Urban digital Radio, Proceedings of the IEE, vol. 68, No. 3 (1980).

Monsen, P., Digital Transmission Performance on Fading Dispersive Diversity Channels, IEEE Transactions on Communications, vol. COM–21, No. 1 (1973).

Raith, K. et al., Multi–Path Equalization For Digital Cellular Radio Operating at 300 KBIT/S, Proceedings of the 36$^{th}$ IEEE Vehicular Technology Conference (1986).

Bennett, M. et al., A Hand–Off Algorithm for Cellular Radio Based on Reed–Solomon Coding, Dialog Abstract from IEEE Colloquium on 'Mobile Radio Networks' (1988).

Herold, W., A Small–Zone Radio Telephone System with Code Division Multiple Access, Proc. Internat. Zurich Seminar, F6 1–4 (1974).

Stjernall, J–E et al., Radio Test Performance of a Narrowband TDMA System, Ericsson Radio Systems AB, S–163 80 pp. 293–299 (1987).
Herold, W., Changing Radio Zones of Fixed Stations by Mobile Subscribers, Communication form AEG–Telefunken Wireless Communications Research Institute, Ulm (Germany), pp. 173–179.
Schenkel, K., Entwurf Eines Integrierten Digitalen Nachrichtensystems mit Vielfachzugriff fur ein Beliebig Verzweigtes Breitbandnetz, AEU 27, pp. 168–176 (1973).
Herold, W., Fangverhalten einer Phasenregelschleife mit Sägezahn–Komparator, AEU 25, pp. 226–230 (1971).
Herold, W., et al., Aufbau und Eigenschaften von Quasiorthogonalen Codekollektiven, AEU 27, pp. 463–470 (1973).
Herold, W., Nachrichtentechnische Zeitschrift, NTZ, 27, pp. 253–259 (1974).
Heynisch, B., NTG Gleichkanalfunksysteme fur die Frequenzokonomische Versorgung Grosser Gebiete, NTG–Fachbereich Sprech—und Datenfunk, AEG, Ulm, pp. 41–46 (1985).
Benndorf, V. et al., Quasissynchroner Gleichwellenfunk–ein Gleichkanalfunk–Verfahren zur Erhohung der Erreichbarkiet in Mobilfunknetzen, Elektrizitatswirtschaft, Jg. 80, Heft 6, pp. 187–198. (1981).
Japanese Patent Abstract vol. 9, No. 169 (E–328).*

* cited by examiner

HANDOVER METHOD FOR MOBILE RADIO SYSTEM

Matter enclosed in heavy brackets [ ] appears in the original patent but forms no part of this reissue specification; matter printed in italics indicates the additions made by reissue.

*This is a continuation of U.S. Reissue Application No. 08/938,840, filed Sep. 26, 1997, now U.S. Pat. No. RE 36,079, which is a reissue of U.S. application Ser. No. 07/365,432, filed Jun. 13, 1989, now U.S. Pat. No. 5,109, 528.*

TECHNICAL FIELD

The present invention relates to a mobile radio system which has a plurality of radio channels for transmitting control information and message information between base stations and mobile stations. More specifically, the invention relates to a method in which the responsibility for transmitting message information to a mobile station is handed over from at least a first base station transmitter to at least a second base station transmitter.

BACKGROUND ART

It is desirable that a mobile radio system has high traffic handling capacity and a high degree of coverage. The traffic handling capacity of a mobile radio system is dependent, inter alia, upon the number of available radio channels and how effectively these channels may be utilised. It is known to arrange several base stations with small covering areas close to each other in a mobile radio system. Available radio channels can then be utilised in a more efficient way for handling peak traffic within a limited geographical area than if base stations with large covering areas are arranged far away from each other in the mobile radio system. Arranging several base stations close to each other can also increase the accessibility in a mobile radio system, particularly if the covering areas of the base stations are mutually overlapping. Two base station with such overlapping covering areas cannot, however, normally use the same radio channel for communication with different mobile stations.

When a mobil station moves from the area covered by one base station to the area covered by another base station in a mobile radio system, the responsibility for communication with the mobile must be transferred from one base station to another. Such transfer in conjuction with an established connection to the mobile station is usually called "handover".

Handover can be a critical function in known traditional mobile radio systems. There is a risk of the established connection being temporarily interrupted or completely lost in conjunction with the handover. There is usually required comparatively extensive signalling in the mobile radio system in conjunction with changing of radio channel at handover. The degree of coverage of a mobile radio system depends, inter alia, on the presence of radio shadows and how the covering areas of the individual base stations overlap each other. The possibility of establishing new connections and maintaining established connections to/from mobiles also depends on the presence of reflections and interference.

For increasing the degree of coverage in a mobile radio system, it is known to transmit substantially the same information to a mobile from two or more base transmitters and to receive information from a mobile at two or more base receivers. The publication "RF PERFORMANCE OF MACROSCOPIC DIVERSITY IN UNIVERSAL PORTABLE RADIO COMMUNICATIONS: FREQUENCY REUSE CONSIDERATIONS" by Richard C. Bernhardt, from IEEE International Conference on Communications, Jun. 22–25, 1986, Toronto, Canada describes different types of cells and placing of transmitters and the result of simulations of such a system. The publication "USER ACCESS IN PORTABLE RADIO SYSTEMS IN THE NOISE LIMITED ENVIRONMENT" by Richard C. Bernhardt, from ICC'87, Jun. 1987, Seattle, Wash., U.S.A., describes different types of cell and placing of transmitters as well as comparsions between different criteria and algorithms for the selection of base transmitter.

U.S. patent application Ser. No. 07/315,561 describes a mobile radio system and a method of transmitting message information where at least two bases at least partially simultaneously transmit substantially the same message information to a mobile. The object with this is, inter alia, to enable the degree of coverage to be made greater without the cells in a mobile radio system needing to be reduced, which gives greater freedom in the selection of cell pattern, and fewer handovers. The intention is that the mobile radio system shall be given better possibilities of establishing new connections and maintaining already established connections. According to the patent application, these objects are achieved by certain relationships between modulation of radio signals and parameters of adaptive equalisers in the mobiles and the distance between base transmitters which transmit the same message information.

in cellular mobile radio systems available channels may be allocated to cells and mobiles in various ways. In systems with fixed channel allocation a base for a particular cell may only use certain predetermined channels. Bases in adjacent cells use different channels. Bases in different cells sufficiently distant from each other may use same channels according to a channel re-use or allocation plan. In systems with adaptive channel allocation some or all channels are a common resource to all base stations, which means that some or all channels may be used by any base as long as the radio transmission conditions permit, i.e. certain carrier to interference or noise level.

SUMMARY OF THE INVENTION

At least in certain mobile radio systems, it is a problem to make the handover so that the risk of temporary interruption in a connection or that the connection is lost in conjunction with handover is sufficiently small. This problem is particularly great with peak traffic. Another problem in connection with handover is the comparatively large need for signalling in the mobile radio system. The object of the invention is, inter alia, to ameliorate these problems.

One object of the present invention is to achieve a handover where the risk of temporary interruption or lost connections can be sufficiently small.

Another object of the present invention is to achieve a handover where the need of signalling via radio signals in the mobile radio system may be comparatively small.

A still further object of the present invention is to achieve a handover which is particularly suitable for mobile radio systems where two or more base transmitters spaced from each other transmit essentially similar message information to a mobile.

Yet another object of the invention is to achieve a handover which is particularly suitable for mobile radio systems with a high degree of coverage and large overlapping between the covering areas of different base transmitters.

In a method in accordance with the invention the responsibility of transferring message information to a mobile station, is handed over from at least one first base transmitter to at least a second base transmitter. Distinguishing for a method in accordance with the invention, and particularly preferred embodiments thereof will be seen from the independent and the dependent claims. Somewhat simplified, it may be said that in a method in accordance with the invention, the same radio channel is preferably used for transmitting message information to the mobile before and after the handover.

The handover preferably takes place without the mobile being informed beforehand that the handover is going to take place. According to a further preferred embodiment of the invention, the radio transmission of message information from a second base station transmitter to the mobile station is started before transmission of message information to the mobile from a first base station transmitter is terminated. Essentially the same message information is thus transmitted during a transition time to the mobile both from a first and a second base station transmitter.

In mobile radio systems where at least two base station transmitters are simultaneously responsible for transmitting message information to at least certain mobiles, it may be preferred not to start or interrupt the transmission from several base transmitters simultaneously in conjunction with the handover. The transmission of message information to the mobile is then preferably started from one of the second base transmitters before initiating transmission of message information from another of the second base transmitters. In such a case, the transmission of message information to the mobile from one of the first base transmitters is preferably terminated before the transmission of such information is terminated from another of the first base transmitters. Initiation and termination of the transmission from the base transmitters preferably takes place in an order such that at least two base transmitters transmit essentially the same message information to the mobiles the whole time.

In the cases where transmission from a second base transmitter must take place on another radio channel than the transmission from a first base transmitter, it is preferable that the radio channels are selected such that during the transition time the mobile station can receive the transmissions from the different base transmitters essentially without interference from each other. Designing the handover of responsibility for transmitting message information to a mobile in accordance with the invention means several advantages, which are accentuated in preferred embodiments.

Perhaps the most important advantage is that in the cases where the same radio channel is utilised by the bases before, during and after the handover, the need for handover signaling via radio signals can be made particularly small. If the mobile sends and receives on the same channels before, during and after the handover, it does not really need to know whether the responsibility for communication has been handed over. In an extreme case, there is thus no need of handover signalling at all via radio signals in conjunction with handover, and all handover signalling could take place in the stationary part of the mobile radio system. Another important advantage is that the risk of temporary interruption in an established connection call to a mobile or that the connection is lost can be made small.

Another advantage is great flexibility with regard to distributing tasks between the mobile and base in conjunction with the handover. Preparations for and initiative to the handover can take place to a greater or lesser extent in the mobile. It will then be possible to form and distribute tasks in conjunction with preparation for, initiation and execution of the handover such that the need of signalling with respect to the handover will be comparatively small.

A still further important advantage with the method in accordance with the invention is that it is particularly suitable in a mobile radio system where at least two base station transmitters are simultaneously responsible for transmitting message information to at least certain mobiles. In such a system the increasing degree of coverage can be utilised to the full in handing over the responsibility in accordance with the invention.

Further advantages ought to be understood by one skilled in the art after having studied the description of preferred embodiments.

BEST MODES FOR CARRYING OUT THE INVENTION

A method in accordance with the invention is particularly suitable for a mobile radio system where at least two base station transmitters are simultaneously responsible for transmitting message information to at least certain mobile stations. It seems therefore to be suitable to describe an embodiment of a method in accordance with the invention in connection with such a system.

Figure 1:
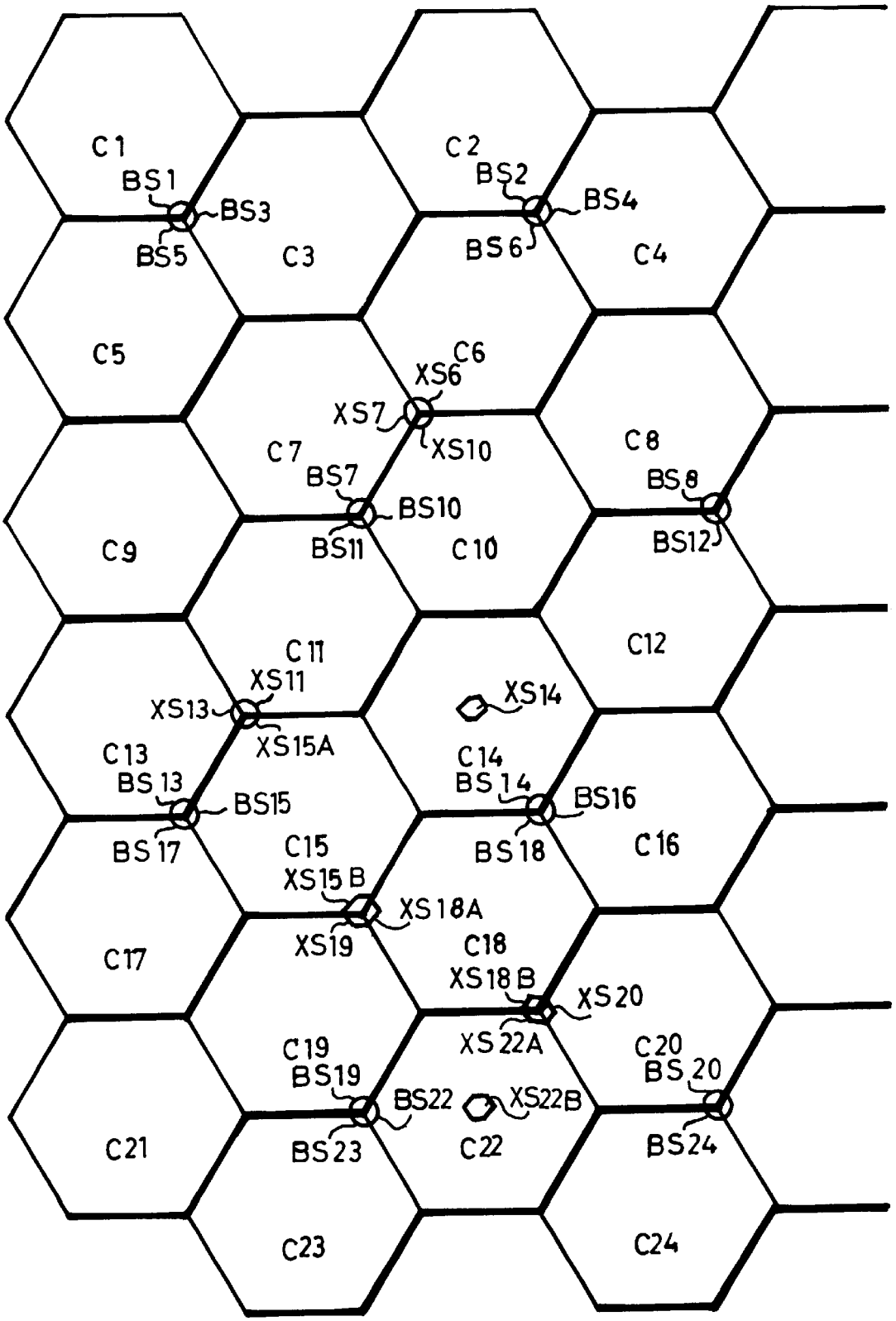
FIG. 1 illustrates cells and location of base station transmitters in a mobile radio system where in certain areas two or three base station transmitters simultaneously transmit message information to at least certain mobiles.

A cellular mobile radio system illustrated in FIG. 1 has mobile and base stations with transmitters and receivers for radio signals. Message information is transmitted digitally to and from the mobiles by transmission and reception of radio signals with digital modulation corresponding to the message information. The radio signals are sent on one of a plurality of radio channels. Several radio channels can share in time multiplex the same radio frequency, and radio signals can be transmitted to and from several mobiles in different time slots on the radio frequency, these slots being associated with the radio channels.

The mobiles may move within and between the cells of the system. The base transmitters are assigned to the cells so that there is at least one base transmitter for each cell, for transmitting signals to the mobiles of the cell.

There is no completely fixed channel allocation for all cells and base stations in the entire system. At least for some base stations and cells there is allowed some freedom in the selection of radio channels. Thus the channel allocation in the system is some kind of dynamic or adaptive channel allocation meaning that at least some channels are a common resource to at least some neighbour bases/cells. Somewhat simplified, there is illustrated in FIG. 1 the division of an area into cells and the assignation of base station transmitters to the cells in a mobile telephone system. For the sake of simplicity in FIG. 1, all cells C1 to C24 are illustrated as regular hexagons with sides L. In practice, the cells will probably have different sizes and shapes. In addition, depending on traffic conditions, it will often be suitable with overlapping in the boundary areas between the cells. To a certain extent, the base transmitters can then off-load each other by handling transmissions to mobiles where such transmission should from a purely geographically point of view, be performed by the base transmitters of a contiguous cell.

For each cell C1–C24 there is an ordinary base transmitter BS1–BS24. For contiguous cells these transmitters are conventionally co-located in groups of three. For example, the base transmitter BS1 for the cell C1 is co-located with the base transmitter BS3 for the cell C3 and with the base transmitter BS5 for the cell C5. Correspondingly, the base transmitter BS14 for the cell C14 is co-located with the base transmitter BS16 for the cell C16 and with the base transmitter BS18 for the cell C18. These co-located ordinary base station transmitters are situated in the boundary regions between the cells to which they are assigned. For example, the ordinary base transmitters BS2, BS4 and BS6 are co-located in the boundary areas between the cells C2, C4 and C6.

Further to the ordinary base transmitters BS1–BS24 the system includes a number of extra base transmitters for certain of the cells. Cells C6, C7, C10, C11, C13, C14, C19 and C20 each has one extra base station transmitter. For each of the cells C15, C18 and C22 there are two extra base transmitters. Of the extra base transmitters XS6, XS7, XS10, XS11, XS13, XS15A, XS15B, XS18A, XS18B, XS19, XS20 and XS22A are co-located in groups with three extra base transmitters in each group in a similar manner as the ordinary base transmitters. Accordingly, for example, the extra base transmitter XS15B for the cell C15 is co-located with the extra base transmitter XS19 for the cell C19 and the extra base transmitter XS18A for the cell C18. On the other hand, neither the extra base transmitter XS14 for the cell C14 nor the extra base transmitter XS22B for the cell C22 are co-located with any other base transmitter, but are situated approximately at the centre of the cell with which they are associated. An extra base transmitter does not need to differ technically from an ordinary base transmitter. For a given cell an extra base transmitter can thus have technical equipment of the same type as an ordinary base transmitter for the same cell. In principle, it can also function in the same way as the ordinary one. If there are two identical base station transmitters for a given cell, either of them may be respectively regarded as ordinary or extra in certain cases.

The extra base transmitter or transmitters for a given cell transmit radio signals which are substantially the same as those sent by the ordinary base transmitter of the cell. The signals are digitally modulated with selective digital message information to the individual mobiles in the cell. The radio signals may also be digitally modulated with general control information common to all mobiles concerned. A mobile in a cell for which there is one or more extra base transmitter can therefore receive, at least in certain cases, corresponding radio signals from more than one base transmitter approximately simultaneously within the same frequency range. Depending on the mutual, relative positions in the cell of the mobiles and bases as well as the transmission times and propagation paths of the radio signals from the base transmitters to the mobile stations, corresponding signals from different base transmitters can be received without, or with a given time shift at the mobile. The greater the distance between the base transmitters associated with the cell, the greater in general can be the time shift. When the ordinary base station transmitters and the extra base station transmitters are situated according to FIG. 1, the distance between two base transmitters for the same cell varies between L and 2L, i.e. between the side and diameter of the regular hexagons. If, for the sake of simplicity, reflections are ignored and the assumption made that the base transmitters transmit without mutual time shifting, the time reception shift at the mobile station could then attain a maximum of 2L/c, where c is the propagation rate of the radio signals.

Figure 2:
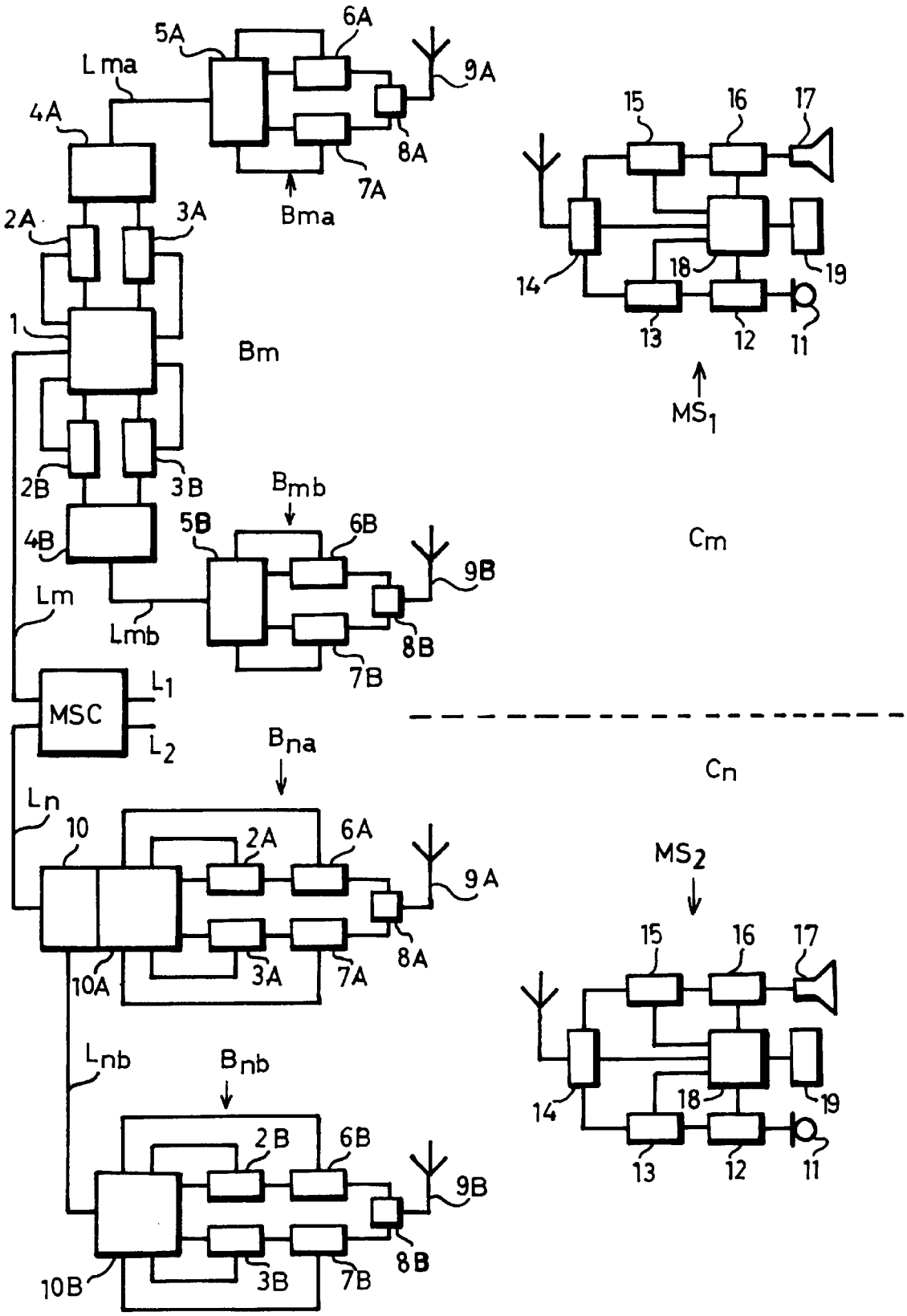
FIG. 2 illustrates two mobiles and some stationary parts of a mobile radio system according to FIG. 1.

In FIG. 2 there are illustrated parts of a mobile radio system in accordance with FIG. 1. A mobile radio exchange MSC is connected via cables $L_1, L_2, \ldots L_m, L_n$ to a plurality of bases of which two, $B_m$ and $B_n$ are illustrated in FIG. 2. The base $B_m$ has a central unit connected via cables $L_{ma}$ and $L_{mb}$ to two transceiver units $B_{ma}$ and $B_{mb}$ situated at a distance from the central unit. The central unit of the base $B_m$ includes a central line and control unit 1, transmission time shifting means 2A and 2B, one for each of the transceivers, reception time shifting means 3A and 3B, one for each of the transceivers and line units 4A and 4B, one for each of the transceivers.

Both transceivers in the base $B_m$ are alike. Each such transceiver contains a line and control unit 5A or 5B, transmitter means 6A or 6B, receiver means 7A or 7B, a transmission-reception filter 8A or 8B and an antenna 9A or 9B.

The base $B_n$ differs partly from base $B_m$, primarily due to its central line and control unit 10 being situated in juxtaposition with one of its transceivers $B_{na}$. Accordingly, no cable with associated line units corresponding to [$L_m$] $L_{ma}$, $L_{mb}$, 4A–5B is needed for the transceiver $B_{na}$, but only for the other transceiver $B_{nb}$. In addition, no transmission or reception time shifting means is included in any central unit in $B_n$, but the corresponding means 2A, 2B, 3A and 3B are respectively included in transceivers $B_{na}$ and $B_{nb}$.

The mobiles $MS_1$ and $MS_2$ are mutually alike. Each mobile includes sound sensing means 11, encoding means 12, transmitting means 13, transmit-receive switch 14, reception means 15, equaliser and decoding means 16, sound reproducing means 17, control means 18 and means 19 for feeding in and out or presentation of digital information.

Apart from the bases having two transceiver units at a distance from each other, and having controllable transmission and reception time shifting means, the mobile radio system in FIG. 2 functions in most respects in a way well-known in mobile radio systems. No complete description of how the system functions in different respects should therefore be necessary for one skilled in the art, and it should only be necessary to describe what is unique or unusual in the mobile radio system according to FIG. 2. One not skilled in the art of mobile radio systems is referred to the technical literature.

Message information e.g. speech or data that the mobile radio exchange forwards towards a mobile in the cell $C_m$, e.g. the $MS_1$, is transmitted from the mobile radio exchange via the cable $L_m$ to the line and control unit 1. From here the information is transferred via the transmission time shifting means 2A, line unit 4A, cable $L_{ma}$ and line and control unit 5A to the transmitting means 6A. The transmitting means 6A transmits, via the transmission-reception filter 8A and antenna 9A, radio signals with digital modulation in correspondance with the message information from the mobile radio exchange.

The message information from the mobile radio exchange is also transferred from the line and control unit 1 via the transmission time shifting means 2B, line unit 4B, cable $L_{mb}$ and line and control unit 5B to the transmission means 6B in the transceiver $B_{mb}$. The transmission means 6B transmits, via the transmission reception filter 8B and antenna 9B, radio signals with digital modulation in correspondance with the information from the mobile radio exchange.

Depending on the delay in transferring the message information to the transmission means 6A and the corresponding delay in transferring to the transmission means 6B the radio signals can be transmitted from the antenna 9A of the transceiver unit $B_{ma}$ substantially without time shifting, or time shifted in relation to the transmission of corresponding radio signals from the antenna 9B of the other transceiver $B_{mb}$.

The radio signals from the antenna 9A i $B_{ma}$ arrive at a given mobile in the cell $C_m$, e.g. the mobile $MS_1$, with or without time shift in relation to corresponding radio signals from the antenna 9B in $B_{mb}$. The possible time shift on arrival at the mobile depends partly on possible time shifting at transmission from the antennas and partly on possible difference in propagation time for the radio waves from the antennas. The transmission time shifting means 2A and 2B have a variable delay and can be controlled by the line and control unit 1, such that the signals are transmitted from the antenna 9A in $B_{ma}$ time-shifted more or less before or after corresponding signals from the antenna 9B in $B_{mb}$. In the preferred embodiment according to FIG. 2, the line and control unit 1 controls the variable delays in the transmission time shifting means 2A and 2B so that the differences in delay in the cables $L_{ma}$ and $L_{mb}$ as well as the differences in the radio signal propagation times are counteracted. This may also be expressed by saying that the line and control unit controls the variable delays in the transmission time shifting means 2A and 2B, such that the time shift of the radio waves on arrival at the mobile is decreased compared with the situation where the means 2A and 2B have the same fixed delay. It could be thought that the ideal case were that the line and control unit controlled the delays in the time shifting means 2A and 2B so that the digitally modulated signals transmitted from the antenna in $B_{ma}$ arrived at the antenna in $MS_1$, exactly simultaneously and in phase with corresponding signals transmitted from the antenna in $B_{mb}$. In practice, this is neither striven for nor normally achieved. Reflections occur as the radio signals are propagated between the antenna, and the mobile has an adaptive equaliser. It is therefore not necessary for the signals from the different transceiver units to arrive exactly simultaneously to the mobile. On the contrary, there is preferably sought a small time shift to achieve diversity against Rayleigh fading. One not skilled in this art and who is desirous of obtaining further information can find it in the technical literature and in publications such as: "Radio Test Performance of a Narrow-band TDMA System-DMS 90", J-E Stjernvall, B. Hedberg, K. Raith, T. Bäckström and R. Löfdahl.

In principle, there are at least two conceivable methods of determining how the line and control unit 1 shall control the delay in the transmission time shifting means 2A and 2B. One method is to estimate in the fixed part of the mobile radio system the time shift between the mobiles radio signals at one of the mobile radio system the time shift between the mobiles radio signals at one of the transceivers $B_{ma}$ and corresponding radio signals at the other transceiver $B_{mb}$. There is thus obtained an estimation of the differences in propagation time to the mobile, these differences depending on the position of the mobile. Remaining differences in delay are related to the fixed part of the mobile radio system, e.g. differences in length of the cables $L_{ma}$ and $L_{mb}$ and are not dependent on the position of the mobile. In the embodiment according to FIG. 2, this method can be applied in practice such that the delays in the reception time shifting means 3A and 3B are adjusted so that information received from the mobile $MS_1$ at $B_{ma}$ arrives at the line and control unit 1 simultaneously as corresponding information received at $B_{mb}$ from the mobile station $MS_1$ arrives at the line and control unit 1. The delays in the transmission time shifting means 2A and 2B are subsequently adjusted in correspondence with the optimum delays in the reception time shifting means 3A and 3B. The other method is to estimate in the mobile the difference in arrival time or time shift between the digitally modulated radio signals from one transceiver $B_{ma}$ and the corresponding digital signals from the other transceiver $B_{mb}$. Some kind of encoding of the radio signals is required for this, which indicates from which transceiver they are transmitted. In TDMA systems it is known to transmit special synchronising words. These can be utilised if they are formed or supplemented with additional individual wards so that two base transmitters for the same cell do not only have identical synchronising words. Alternatively, special synchronising words can be transmitted from the base station transmitters solely to enable the mobile to estimate the differences in arrival times or time shifts. The mobile transmits information about the estimated arrival time difference or time shift via radio signals to the fixed part of the system, where it is utilised for controlling the transmission time shifting means 2A and 2B. The line and control unit 1 then receives, via the respective line units 5A, 4A and 5B, 4B, information about estimated arrival time difference from the mobile in the same way as the line and control unit obtains message information from the mobile.

It is conceivable per se, but hardly to be preferred, to combine both methods for controlling the transmission time shift in a mobile radio system according to FIG. 2.

Measuring the difference in arrival time or time shifting for corresponding radio signals can be performed in a conventional way, e.g. with the aid of correlation. In the cases where the radio signals conventionally contain predetermined synchronising patterns (words), the time difference between the appearance of these in different signals can be measured using conventional methods. A mobile control means 18 and/or a base line and control unit 1 or 10, possible in combination with the transceiver's line units 5A and 5B can then include time measurement means for estimating reception time shifting, or arrival time comparison means for comparing arrival times.

When so required, a base preferably conventionally utilises the same transmitter means and antenna for transmitting, in time multiplex within the same frequency range, radio signals digitally modulated with message information to different mobiles associated with the same cell. Radio signals with message information to a given mobile are then transmitted from different base transmitters with a possible transmission time shift which is specially adjusted with regard to the position of this particular mobile. The case can arise where a base in a mobile radio system needs to transmit a radio signal with information other than message information intended for reception by several or all of the mobiles in the cell, e.g. information as to the identity of the base/cell. Such signals are preferably transmitted simultaneously without mutual time shifting, from the transceivers $B_{ma}$, $B_{mb}$ and $B_{na,}$ $B_{nb}$ of the base in a mobile radio system according to FIG. 2. The transmission time shifting means are then controlled to a balancing state where the delay of information from the line and control unit 1 to the antenna in one transceiver $B_{ma}$ is equally as great as the delay of information from the line and control unit 1 to the antenna in the other transceiver $B_{mb}$. The corresponding situation can apply when a base "listens" in unoccupied combinations of time slot and frequency range for set up calls from mobiles in unknown positions relative to the transceivers of the base. The reception time shifting means 3A and 3B can then be controlled to a balancing state where the delay of the message information from the antenna in one transceiver $B_{na}$ to the line and control unit 9 is equally as great as the delay of information from the antenna in the other transceiver $B_{nb}$ to the line and control unit 9.

The mobiles $MS_1$ and $MS_2$ have adaptive equalisers, whereby the digital modulation during a modulation time interval in the radio signals transmitted from a base transmitter can be reconstructed from signals received during a reception time interval. In known cellular, digital, mobile radio systems with only one base transmitter per cell, the reception time interval of the equalisers is dimensioned according as the dispersion on the radio channel, i.e. expected time shifts between corresponding signals from a single base transmitter due to reflections. Because of the equaliser, not only the radio signal having the greatest amplitude or arriving first to the mobile station is utilised for reconstructing the digital modulation, but also other corresponding radio signals arriving with a time shift within the extent of the equaliser's reception time interval can be utilised. The mobiles in a system according to FIGS. 1 and 2 preferably have equalisers which are dimensioned such that the reception time interval of the mobile in reconstruction of the digital modulation is greater than the time it takes for signals to propagate a distance as long as the greatest distance between two base transmitters associated with the same cell within a restricted geographical area. With the base transmitters placed according to FIG. 1, the mobile equalisers would thus be dimensioned for a reception interval in reconstruction which is greater than 2L/c. However, there can be dispersion, and reflections can extend the propagation time from a base transmitter to a mobile more than the extension of the propagation time from another base transmitter for the same cell. The reception time interval of the mobiles is therefore preferably substantially greater than the time it takes for radio signals to propagate a distance which is just as great as the greatest distance between two base transmitters associated with the same cell within the geographical area in question.

In mobile radio systems according to FIGS. 1 and 2, the modulation time interval of the digital modulation of the signals can be of the same order of magnitude as the time it takes for radio signals to propagate a distance just as long as the greatest transmitting distance between two base station transmitters serving the same cell within a limited area. Although the use of extra base transmitters in combination with equalizers described affords greater advantages the smaller the modulation time interval is in relation to this propagation time, and the described combined use maybe has its greatest importance when the modulation time interval has the same size as or is less than the mentioned propagation time, the combined use of equalizers and extra base transmitters can mean substantial advantages even when the modulation time interval is some few times greater than the mentioned propagation time.

It is conceivable to use different kinds of digital modulation in a mobile radio system, whereby somewhat different relationships can exist between information transmission rate and modulation time interval. In digital modulation of the radio signals involving transmission of one symbol at a time of a sequence of uncorrelated symbols, the modulation time interval will be the time during which a single symbol is decisive for the digital modulation. For example, if a sequence of binary symbols individually and one at a time determines the modulation, the modulation time interval will be the time during which one symbol determines the modulation. This can also be expressed by saying that the modulation time interval will be the inverted value of the transmission rate in bits. In digital modulation of the signals involving two or more at a time of a sequence of digital symbols being decisive for the modulation during wholely or partly overlapping times, the modulation interval can be the time when a preceeding, but not the nearest subsequent symbol affects the modulation. For example, in digital modulation according to SE 8102802-9, FIGS. 1–2, a symbol affects the phase of a carrier wave during a time interval 3T. The nearest preceeding symbol also affects the phase change of the carrier wave during a first part 2T of the time interval 3T. The nearest subsequent symbol also affects the change of phase of the carrier wave during a last part of 2T of the time interval 3T. In this case modulation time interval will be T, which agrees with what is called the symbol time interval in SE 8102802-9. In general, it can be said that the modulation time interval is to be interpreted as the interval in time between two successive changes in the transmitted digital modulation.

Perhaps the most usual reason for handover in conventional mobile radio systems is that a mobile moves from one area which is best served by one base to another area which is best served by another base. Of course, there may be other reasons, e.g. changed traffic conditions or changed radio reception conditions.

When three or more bases can receive radio signals from a mobile, the position of the latter can be estimated by comparison of the radio propagation times. The estimation can be imporved if more than three bases are used. Knowledge of the position of the mobile can be used by the stationary part of the mobile radio system for selecting what bases are suitable for use as new bases when handing over the responsibility. The mobile radio exchange or other stationary part of the system assigns new bases the responsibility in a manner such that communication can be maintained with good quality as the mobile travels through the cell structure.

Knowledge of the position of the mobile can also be used as a criterion for performing the handing over of responsibility. For example, if the mobile moves out of the cell which is serving it at the moment, this is an indication that a handover of responsibility should soon take place, irrespective of whether the communication quality is still good.

In different known mobile radio systems, the decision for handing over can take place in more or less different ways. Different criteria have been proposed for the decision as to if and where handover is to take place. Collection of the basis for the handover decision can take place in different ways. The distribution of tasks and the signalling in connection with handover between mobiles and the stationary part of the mobile radio system can differ from system to system. All this is well known to one skilled in the art. One not skilled in the art can obtain necessary information from the technical litterature or United States patents in the field of cellular mobile radio.

What is distinguishing for handing over the responsibility in accordance with the present invention is primarily the actual execution of handover. For the handover decision, at least in certain cases, known parameters can be used such as the signal-noise ratio for transmitting signals to and from the mobiles. The signal-noise ratio or other parameters can be measured, either solely in the stationary part of the mobile radio system e.g. by the base central or control units or solely in the mobiles by the reception and control means or in both mobiles and the stationary part. In the handover decision, the traffic conditions in different parts of the mobile radio system can be given attention, substantially conventionally, e.g. if certain bases tend to have too high traffic while adjacent bases have unoccupied capacity for further traffic.

An embodiment of the excution of handing over responsibility for the communication in accordance with the invention will now be described in connection with FIG. 2. For the sake of simplicity, it is assumed that handing over the responsibility will take place in conjunction with a mobile moving from the position of $MS_1$ in FIG. 2 to the position of $MS_2$ in FIG. 2.

Sometime before the handover, the mobile is in the position of $MS_1$ within the coverage area of the base station $B_m$, but outside the coverage area of the base station $B_n$, i.e. the radio transmission conditions for radio signals between the mobile station and $B_{ma}$ or $B_{mb}$ are suffiently good, but the radio transmission conditions for radio signals between the mobile and $B_{na}$ and $B_{nb}$ are too poor.

Sometime after the handover, the mobile is in the position of $MS_2$ within the coverage area for the base $B_n$, but outside the coverage area for the base $B_m$, i.e. the radio transmission conditions for radio signals between the mobile and $B_{na}$ and $B_{nb}$ are sufficiently good, but the radio transmission conditions for radio signals between the mobile and $B_{ma}$ and $B_{mb}$ are too poor.

When the mobile has moved to position somewhere between the positions of $MS_1$ and $MS_2$, a handover decision is made, and this decision may be based on facts such as the radio transmission conditions and traffic within the coverage areas of the base stations. The decision is made by the mobile radio exchange or possible some other stationary part of the mobile radio system.

Before handing over the responsibility for communication with the mobile, it is tested in the stationary part of the mobile radio system whether the second base transmitter can use the same radio channel after handover for transmitting message information to the mobile as the radio channel the first base transmitter used before handover. This may also be expressed by saying that the stationary part tests whether a change of radio channel can be avoided on handover.

This testing takes place according to predetermined rules based on predetermined parameters. For example, if the base to which the responsibility is to be handed over already utilises the radio channel in question for communication with another mobile having higher priority, a change of a radio channel must take place on handover. On the other hand, if the base to which responsibility is to be handed over does not utilise the radio channel in question, and possible transmission on this radio channel would not interfere with other traffic, there is no need for changing channels on handover. Another reason for having to change channels is that the channel in question has too much interference in the cell served by the base to which responsibility is to be handed over. Other rules or reasons for, and against, changing channels will be understood by one skilled in this art.

After a decision as to handover and radio channel has been made, one of the base transmitters $B_{na}$ or $B_{nb}$ begins to transmit the same message information to the mobile as the base transmitters $B_{ma}$ and $B_{mb}$. This base transmitter is preferably transmitting on the same channel as the base transmitters $B_{ma}$ and $B_{mb}$. In a TDMA mobile radio system, this means that $B_{na}$ or $B_{nb}$ begin to transmit the same message information as $B_{ma}$ and $B_{mb}$ on the same radio frequency and in the same time slot as $B_{ma}$ and $B_{mb}$. The transmission times at $B_{na}$ and $B_{nb}$ of the radio signals is preferably adjusted to corresponding transmission times for the signals at $B_{ma}$ and $B_{mb}$ in accordance with what has been described above. After transmission of the message information to the mobile has been started from $B_{na}$ and $B_{nb}$, the transmission of corresponding message information to the mobiles from one of the base transmitters $B_{ma}$ and $B_{mb}$ is terminated. One of the base transmitters $B_{ma}$ or $B_{mb}$ then transmits the same message information, e.g. speech or data, to the mobile as one of the base transmitters $B_{na}$ and $B_{nb}$. Neither one of the two other base transmitters in FIG. 2 then transmit corresponding information to the mobile. The one of the base transmitters $B_{ma}$ and $B_{mb}$ which has the best radio transmission conditions and the one of base transmitters $B_{na}$ and $B_{nb}$ which has the best radio transmission conditions preferably transmit to the mobile.

After of the base transmitters $B_{ma}$ or $B_{mb}$ has ceased to transmit message information to the mobile, a further one of the base transmitters $B_{na}$ or $B_{nb}$ beings to send message information to the mobile. Both $B_{na}$ and $b_{nb}$ as well as one of the other base transmitters $B_{ma}$ and $B_{mb}$ are then transmitting the same message information to the mobile. All three transmitters preferably transmit on the same radio channel, and in a TDMA mobile radio system this means the same radio frequency and same time slot. The transmission times of $B_{na}$ and $B_{nb}$ and at the third base transmitter of the radio signals are preferably adjusted to each other in agreement with what has been described above.

After both $B_{na}$ and $B_{nb}$ have begun to transmit the same message information to the mobile as the remaining base transmitter of $B_{ma}$ and $B_{mb}$, the transmission of message information to the mobile is terminated from this remaining base transmitter. Both $B_{na}$ and $B_{nb}$ are then transmitting message information to the mobile, whereas none of the base transmitters $B_{ma}$ and $B_{mb}$ is transmitting such information to the mobile. At this, the responsibility for communication between the mobile has been handed over from the base transmitters $B_{ma}$ and $B_{mb}$ to the base transmitters $B_{na}$ and $B_{nb}$. This may also be expressed by saying that responsibility for the communication has been handed over from the base $B_m$ to the base $B_n$, i.e. an execution of handover is completed.

During the whole of the above described handover, at least two of the base transmitters send the same message information to the mobile. During certain times there are three base transmitters sending the same message information. On the other hand, all base transmitters of the affected stations never send the same information to the mobile. The risk of accidental interruption in the transmission of message information between the mobile and the fixed part of the mobile radio system will thus be small. Simultaneously, the receiving time shift at the mobile will be less than if all base transmitters were to send the same message information to the mobile. In addition, re-use of radio channels if facilitated in the mobile radio system when all affected base transmitters never send simultaneously on the same radio channel.

If, for some reason, it is necessary to change radio channels in conjunction with handing over the responsibility for communication from the base $B_m$ to the base $B_n$, it is to be preferred that the channel which is to be used after handover is selected such that during a transition time the mobile can receive the same message information on both channels. In a TDMA system according to FIG. 2, this means that a base transmitter, e.g. $B_{na}$, begins to transmit the same message information as the base transmitters $B_{ma}$ and $B_{mb}$, but in another times slot, so that the radio signals from $B_{na}$ arrive at the mobile during other times other than the radio signals from $B_{ma}$ and $B_{mb}$. When the base transmitter $B_{nb}$ begins to transmit message information to the mobile, it transmits in the same time slot as $B_{na}$. Due to $B_{na}$ and $B_{nb}$ transmitting message information in a time slot than the one used by $B_{ma}$ and $B_{nb}$, the mobile can receive, by modifying its radio receiver tuning, both the message information transmitted by $B_{na}$ and/or $B_{nb}$ and the message information transmitted by $B_{ma}$ and $B_{mb}$. In this case, however, the mobile must be given advance information as to the handover.

If handing over the responsibility for communication is to take place from three or more base transmitters to more than two base transmitters, its execution will naturally be somewhat different than what has been described in connection with FIG. 2, since the transmission form three or more base transmitters is to be terminated or started. Different orders for starting and terminating transmission are then conceivable. Common for these varients is, however, that at least two base transmitters always transmit the same message information to the mobile. In addition, the transmission of message information is always started from at least one base, to which responsibility shall be handed over before transmission of message information is terminated from all base transmitters, from which the responsibility shall be handed over. The order is preferably such that never all base transmitters simultaneously transmit the same message information to the mobile in conjunction with the handover.

A mobile radio system where at least two base transmitters are simultaneously responsible for transmitting message information to a mobile does not need to be formed according to the above, but can differ to a greater or lesser extent from the system described above. For example, it is conceivable to co-localise at least parts of the equipment in an ordinary base transmitter with parts of the equipment in the extra base transmitter for the same cell, providing that the antennas are spaced from each other. In an extreme case, it is conceivable, in principle, for all equipment excepting the antennas to be co-localised to one place, i.e. in the vicinity of one of the antennas, and that the antennas are fed by signals at radio frequency via a cable from this place. By "base transmitter" shall be accordingly understood at least a transmitter antenna for radio signals and preferably more or less of the remaining means required in a base. In a base transmitter there are preferably included at least means corresponding to the means included in a transceiver unit $B_{ma}$ or $B_{mb}$ in FIG. 2.

To avoid misunderstanding, it is pointed out that none of the base transmitters to which responsibility shall be handed over is a slave transmitter to any base transmitter from which the responsibility shall be handed over. From FIG. 2 it will be seen, for example, that the base transmitters $B_{na}$ and $B_{nb}$ can be controlled directly by the mobile radio exchange MSC and independently of how the exchange controls the base transmitters $B_{ma}$ and $B_{mb}$.

A method in accordance with the invention is of course not restricted to a given implementation of base transmitter, even if it is assumed in the example above that base transmitters can start and terminate transmission at different times.

In actual fact, a method in accordance with the invention is not restricted to mobile radio systems with two or more base transmitters per cell, and it is conceivable to apply embodiments of a method in accordance with the invention in a mobile system, the method involves, summarily explained, that the same radio channel is used both before and after handover, if possible, for transmitting message information to the mobile. A decision on handover is preferably made in the mobile radio exchange or other stationary part of the system, and the handover takes place without the mobile being formed beforehand. If the mobiles have equalizers and the system transmits message information digitally by digital modulation of radio signals, it is also preferably in this case as well that the transmission of message information is started from the base transmitter to which responsibility is to be handed over, before transmission of the same information is terminated from the base transmitter from which responsibility is to be handed over. In this case also, the same message information is transmitted during a transition period to the mobile from two base transmitters. If it is not possible to utilise the same radio channel for some reason, it is then preferable in such a system to select the different channels such that during a transition period the mobile can receive the transmissions from the different base transmitters essentially without their mutually obstructing each other. In a TDMA system with mobiles according to FIG. 2, this means that the base transmitters transmit in different time slots. The advantages with a method in accordance with the invention will then be substantially less, however, than in a system according to FIGS. 1 and 2, where the same radio channel can be utilised.

A method in accordance with the invention is not limited to described embodiments or mobile radio systems according to FIGS. 1 and 2, but can be applied and varied within the scope of the claims.

I claim:

[1. In a mobile radio communication system comprising base stations and mobile stations and a plurality of radio channels for transmitting control information and message information between base stations and mobile stations, said base stations and mobile stations including radio transmitters and radio receivers for a plurality of radio channels, a method for handing over the responsibility for transmitting message information to a mobile station from at least one first base station transmitter to at least one second base station transmitter, comprising the steps of:

before handing over the responsibility carrying out a test in the stationary part of the system to see whether after the handover the second base station transmitter can use the same radio channel for transmitting message information to the mobile as the radio channel used by the first base station transmitter before handover; and if the test result is positive then using the same radio channel after the handover as before for transmitting message information to the mobile.]

[2. A method according to claim 1 comprising the further step of:

executing handover without first informing the mobile of the handover.]

[3. A method according to claim 1 comprising the further steps of:

starting the transmission of message information to the mobile station from the second base station transmitter before terminating the transmission of message information to the mobile station from the first base station transmitter; and transmitting substantially the same message information during a transition period from both the first base station transmitter and the second base station transmitter.]

[4. In a mobile radio communication system comprising base stations and mobile stations having radio transmitters and radio receivers for transmitting control information and message information therebetween, a method for handing over the responsibility for transmitting message information to a mobile station from at least one first base station transmitter to at least one second base station transmitter comprising the steps of:

starting the transmission of message information to the mobile station from the second base station transmitter before terminating the transmission of message information to the mobile station from the first base station transmitter; and transmitting substantially the same message information during a transition period from both the first base station transmitter and the second base station transmitter.]

[5. A method according to claim 4 comprising the further steps of:

before handing over the responsibility, carrying out a test in the stationary part of the system to see whether after the handover the second base station transmitter can use the same radio channel for transmitting message information to the mobile as the radio channel used by the first base station transmitter before handover; and when the radio transmission conditions and remaining radio communication in the system permit, then using the same radio channel after the handover as before for transmitting message information to the mobile.]

[6. A method according to claim 5 comprising the further steps of:

executing the handover without first informing the mobile station of the handover.]

*7. In a mobile radio communication system comprising base stations and mobile stations having radio transmitters and radio receivers for transmitting control information and message information therebetween, a method for handing over the responsibility for transmitting message information to a mobile station from at least one first base station transmitter to at least one second base station transmitter comprising the steps of:*

*determining whether the second base station can use a same radio channel as said first base station for transmitting message information;*

*starting the transmission of message information to the mobile station from the second base station transmitter before terminating the transmission of message information to the mobile station from the first base station transmitter; and*

*transmitting substantially the same message information during a transition period from both the first base station transmitter and the second base station transmitter.*

*8. The method of claim 7, wherein said step of determining further comprises the step of:*

*determining whether said second base station already uses said same radio channel resource.*

*9. The method of claim 7, wherein said step of determining further comprises the step of:*

*evaluating interference associated with usage of said same radio channel by said second base station.*

*10. The method of claim 7, wherein if said mobile radio communication system is a TDMA mobile radio system, then said same radio channel is the same radio frequency and same time slot.*

*11. In a mobile radio communication system comprising base stations and mobile stations having radio transmitters and radio receivers for transmitting control information and message information therebetween, a method for handing over the responsibility for transmitting message information to a mobile station from at least one first base station transmitter to at least one second base station transmitter comprising the steps of:*

*evaluating interference associated with a radio channel over which message information can be transmitted by said second base station;*

*selectively starting the transmission of message information to the mobile station from the second base station transmitter on said radio channel before terminating the transmission of message information to the mobile station from the first base station transmitter; and*

*transmitting substantially the same message information during a transition period from both the first base station transmitter and the second base station transmitter.*

*12. The method of claim 11, wherein if said mobile radio communication system is a TDMA mobile radio system, then said radio channel is defined by a radio frequency and a time slot.*

* * * * *